UNITED STATES PATENT OFFICE.

THOMAS A. EDISON, OF LLEWELLYN PARK, NEW JERSEY.

PHONOGRAM-BLANK.

SPECIFICATION forming part of Letters Patent No. 400,648, dated April 2, 1889.

Application filed July 30, 1888. Serial No. 281,457. (No model.)

*To all whom it may concern:*

Be it known that I, THOMAS A. EDISON, of Llewellyn Park, in the county of Essex and State of New Jersey, have invented a certain new and useful Improvement in Phonogram-Blanks, (Case No. 796,) of which the following is a specification.

The object of my invention is to produce phonogram blanks or bodies on which are to be produced a record of sound-vibrations, and which are to reproduce the same by the aid of the phonograph, which phonogram-blanks shall be composed of a material having superior qualities for receiving such record and reproducing sound therefrom.

I have found that the various waxes are very desirable to use in the composition of such phonogram-blanks, but that most waxes if used by themselves are too soft to be used for this purpose. I therefore mix with the wax a harder material, which will produce a harder compound.

I have found that stearic acid is an exceedingly desirable hardening material for this purpose. I may mix this material with any suitable wax—such as ceresin, beeswax, or paraffine—but of these materials I prefer to use ceresin either alone or mixed with a small percentage of beeswax. I prefer the yellow ceresin, because it is cheaper than white ceresin.

I have found the best mixture to be as follows: About one hundred parts, by weight, of ceresin, about twenty-five parts of beeswax, and about twenty-five parts of stearic acid. The materials are simply melted together by heat and the melted compound is molded in suitable molds into the shape required for the phonogram-blanks, preferably into the form of hollow cylinders.

What I claim is—

1. Phonogram-blanks made of a mixture of a wax with stearic acid, substantially as set forth.

2. Phonogram-blanks made of a mixture of ceresin and stearic acid, substantially as set forth.

3. Phonogram-blanks made of a mixture of ceresin, beeswax, and stearic acid, substantially as set forth.

4. Phonogram-blanks made of a mixture of ceresin, beeswax, and stearic acid, in about the proportion, by weight, of one hundred parts of ceresin, twenty-five parts of beeswax, and twenty-five parts of stearic acid, substantially as set forth.

This specification signed and witnessed this 27th day of July, 1888.

THOS. A. EDISON.

Witnesses:
RICHD. N. DYER,
WILLIAM PELZER.